United States Patent [19]

Price et al.

[11] Patent Number: 4,795,130
[45] Date of Patent: Jan. 3, 1989

[54] PISTON BIASING MEANS

[75] Inventors: Glen E. Price, Caney, Kans.; Marvin E. Reinecke, Dewey; James N. Hilderbrand, Tulsa, both of Okla.

[73] Assignee: Applied Automation, Inc., Bartlesville, Okla.

[21] Appl. No.: 422,781

[22] Filed: Sep. 24, 1982

[51] Int. Cl.[4] .................... F16K 31/122; F16K 7/00
[52] U.S. Cl. .................................... 251/62; 251/63.4; 137/863; 137/869; 92/130 R
[58] Field of Search .......... 137/863, 597, 595; 251/62, 63.4, 63.6, 337; 92/130 R, 133

[56] References Cited

U.S. PATENT DOCUMENTS

| | | | |
|---|---|---|---|
| 2,298,253 | 10/1942 | Dillman et al. | 251/337 |
| 2,588,656 | 3/1952 | Paget | 251/61.5 |
| 2,665,711 | 1/1954 | Parks | 251/61.5 |
| 2,682,890 | 7/1954 | May | 251/63.5 |
| 2,711,184 | 6/1955 | Ehlke | 251/61.5 |
| 2,916,045 | 12/1959 | Auch | 251/337 |
| 3,062,525 | 11/1962 | Schutmaat | 251/337 |
| 3,140,615 | 7/1964 | Broerman | 217/331 |
| 3,188,048 | 6/1965 | Sutherland | 251/337 |
| 4,049,017 | 9/1977 | Jones | 251/337 |
| 4,112,766 | 9/1978 | Ragains | 251/62 |
| 4,333,500 | 6/1982 | Broerman | 137/863 |
| 4,335,744 | 6/1982 | Bey | 251/63.5 |
| 4,423,800 | 1/1984 | Kobiske et al. | 251/337 |

Primary Examiner—Samuel Scott
Assistant Examiner—Allen J. Flanigan
Attorney, Agent, or Firm—George E. Bogatie

[57] ABSTRACT

A piston biasing means including, a coil-type spring, adapted to exert pressure on one side of a piston to be biased in a predetermined direction, a spring retaining means which is slidable toward and away from the piston when the spring is compressed and released and centering means, preferably including pivot balls on each end of the spring, so as to make point contact and rolling contact with the piston. A spring adjusting means to adjust the tension on the spring is also included. A piston assembly and valve assembly incorporating the piston biasing means are also described.

22 Claims, 3 Drawing Sheets

PISTON BIASING MEANS

The present invention relates to piston biasing means. In another aspect, the present invention relates to a piston assembly. In yet another aspect, the present invention relates to a valve assembly.

BACKGROUND OF THE INVENTION

Numerous spring-type biasing means for biasing a piston in a predetermined direction have heretofore been proposed. While such mechanical biasing means can be manufactured at a relatively low cost and the resultant inaccuracies in movement and alignment can be tolerated in most uses, there are some uses which are particularly demanding insofar as accuracy of movement and alignment is concerned, thus making mechanical or spring-type biasing means an illogical choice.

For example, where the piston of a valve having a slide-type closure means is biased in one direction by a mechanical biasing means and in the opposite direction by a pressurized fluid, such as gas, mechanical biasing means create numerous problems. This is particularly true when the piston movement is extremely small and the valve, as such, must operate to open and close under severe conditions, such as high pressure and with extreme accuracy, as where the valve is to be utilized at high pressures in gas or liquid chromatography. A valve suitable for use in the last mentioned service is described in U.S. Pat. No. 3,633,426. This particular valve has been highly successful for use as a sample valve, a back flush valve or a column switching valve in gas or liquid chromatography. This particular valve includes a diaphragm selectively distorted by a plurality of slide-type closure means, a set of pistons for alternately operating selected closure means, a pressurized fluid means for moving the pistons in one direction and a spring-type biasing means for biasing the pistons in the opposite direction. The biasing means inludes a plurality of Belleville spring washers. Such spring elements are relatively expensive to manufacture and numerous problems have been encountered in the manufacture thereof. The end result is that a number of such spring washers are not suitable for the particular use to which they are to be put because of the application of uneven pressure to the piston and inaccuracies of alignment, which also results in inaccurate piston movement. Further, any spring-type biasing means requires adjustment both for initial use and during use.

SUMMARY OF THE INVENTION

It is, therefore, an object of the preset invention to provide an improved piston biasing means which overcomes the above and other problems of the prior art. Another object of the present invention is to provide an improved piston assembly which overcomes the above and other problems of the prior art. Yet another object of the present invention is to provide improved valve assembly which overcomes the above and other problems of the prior art. A further object of the present invention is to provide a spring-type piston biasing means, including an improved spring retaining means. Another and further object of the present invention is to provide a spring-type piston biasing means, including an improved centering means. Still another object of the present invention is to provide an improved piston biasing means adapted to provide accurate piston movement. Yet another object of the present invention is to provide an improved piston biasing means adapted to provide accurate movement of the piston for a small distance. A further object of the present invention is to provide an improved piston biasing means adapted to provide improved alignment of the piston. Another object of the present invention is to provide an improved piston biasing means which is adjustable. A further object of the present invention is to provide improved piston assembly, including a piston biasing means capable of accomplishing any or all of the above-mentioned objectives. A still further object of the present invention is to provide an improved valve assembly, including a piston biasing means capable of accomplishing any or all of the above-mentioned objectives. These and other objects and advantages of the present invention will be apparent from the following description when read in conjunction with the drawings.

The present invention provides a piston biasing means, including a coil spring, adapted to exert pressure on one side of a piston to be biased in a preselected direction, a retaining means, adapted to retain the spring, at least a portion of which retaining means is slideable toward and away from the piston responsive to the compression and the release of the spring, and a centering means operatively associated with the retaining means and adapted to maintain the retaining means and the spring axially aligned with the piston. In another embodiment spring adjusting means are included. Another aspect of the present invention relates to a piston assembly including the improved piston biasing means. In still another aspect, the present invention relates to a valve assembly, including the improved piston biasing means.

DESCRIPTION OF THE PREFERRED EMBODIMENTS

Figure 1:
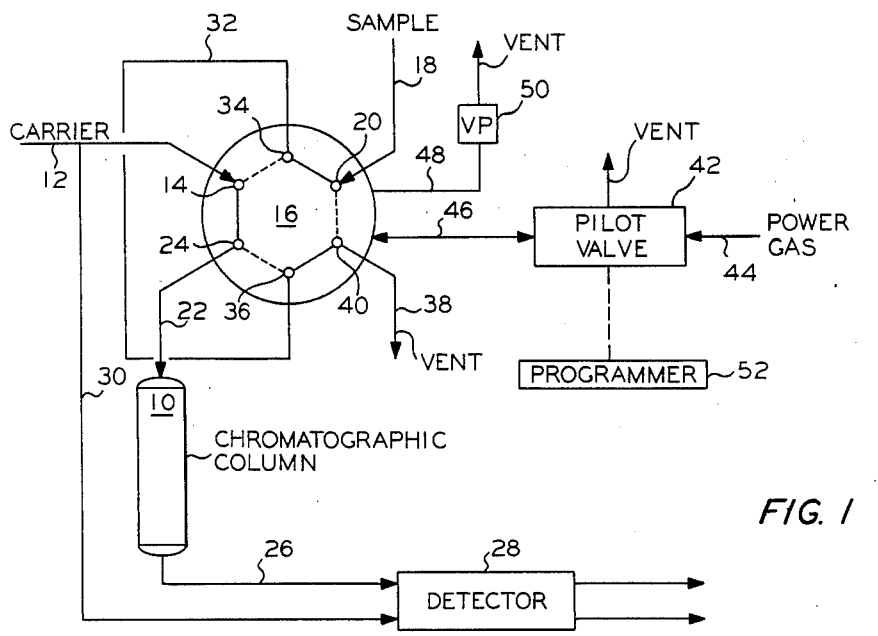
FIG. 1 is a schematic representation of a chromatographic analyzer having a sample valve incorporating the present invention.
Figure 5:
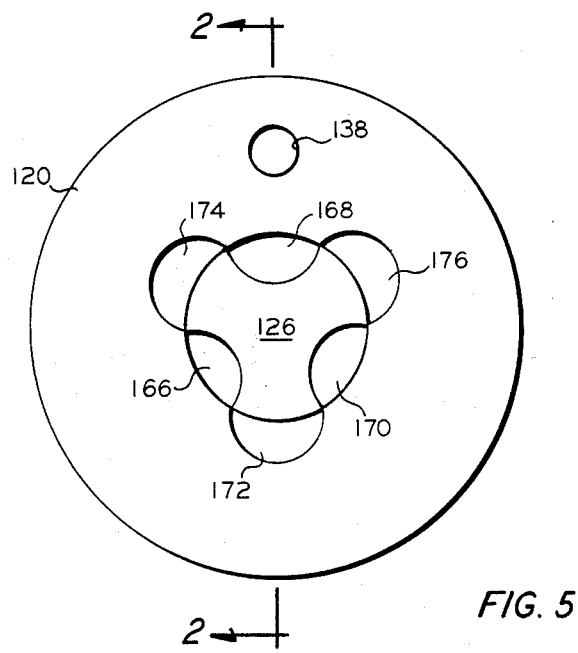
FIG. 5 is a view taken along the line 5—5 of FIG. 2.
Figure 2:
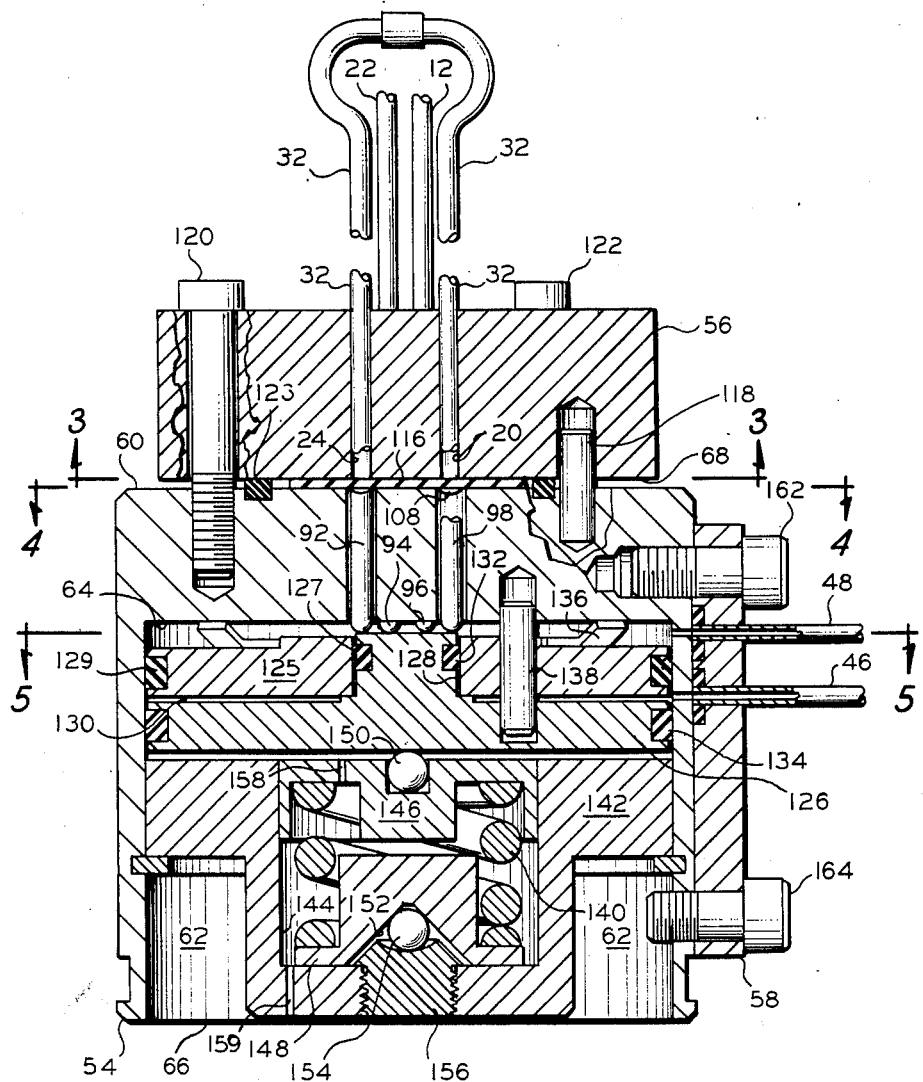
FIG. 2 is a cross sectional view of a sample valve, including the present invention, which may be employed in the analyzer of FIG. 1.
Figure 3:
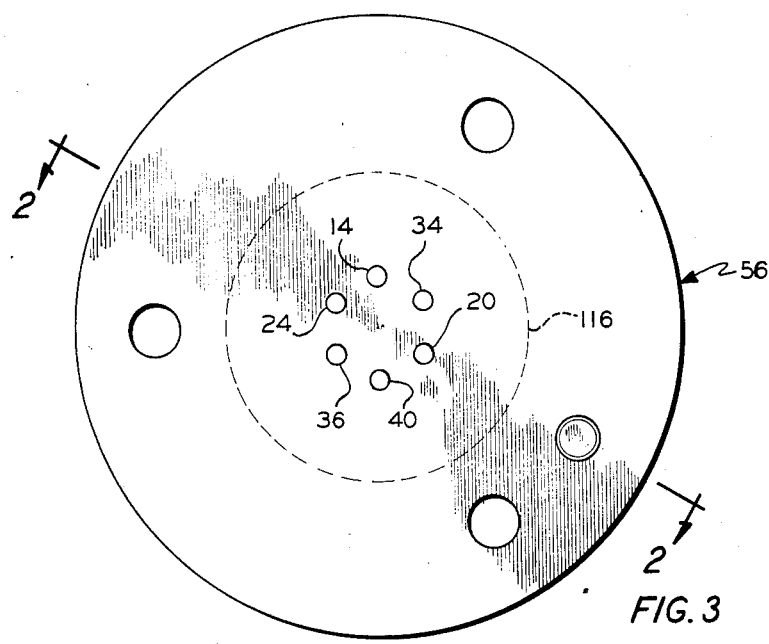
FIG. 3 is a view taken along the line 3—3 of FIG. 2.
Figure 4:
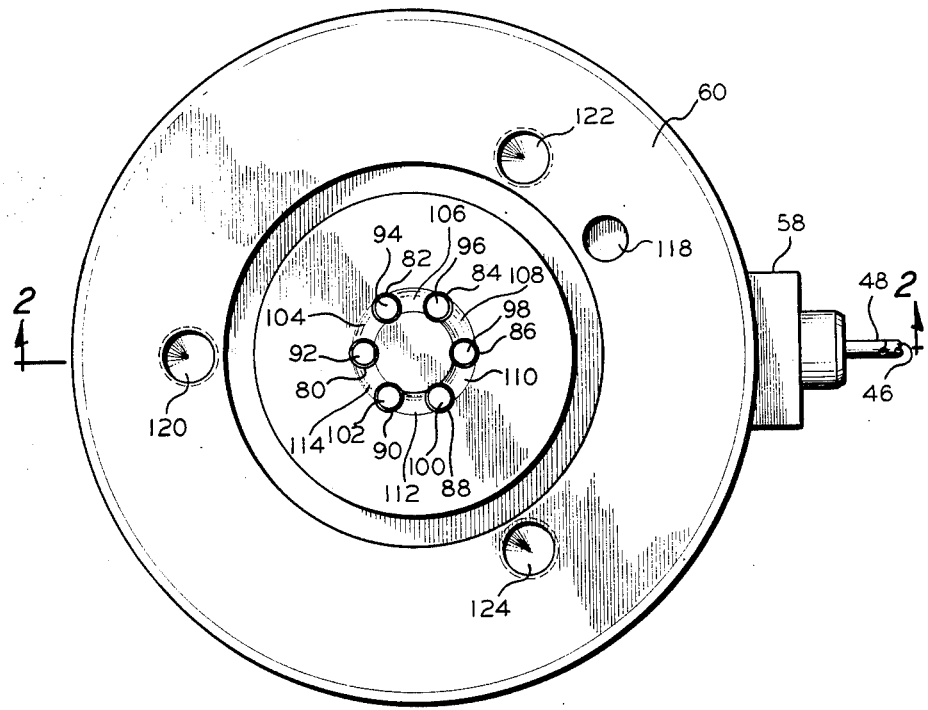
FIG. 4 is a view taken along the line 4—4 of FIG. 2.

FIG. 1 of the drawings is a schematic representation of a chromatographic analyzing system in which a valve incorporating the present invention is particularly adapted for use. In accordance with FIG. 1, there is shown chromatographic column 10 which contains any suitable packing or partitioning material. Carrier fluid is introduced through line 12, which communicates with a first inlet port 14 of a sample valve 16. The carrier fluid can be either a gas or a liquid, depending upon the particular packing material and the desired separation. A sample fluid to be analyzed is introduced through line 18, which communicates with inlet port 20 of valve 16. Line 22 leads from sample port 24 to the inlet of column 10. Line 26 extends from the outlet of column 10 to the first inlet of a detector 28. A portion of the carrier fluid is directed through line 30 to a second inlet of detector 28. As is well known in the art, detector 28 can be any suitable instrument which is capable of providing an output signal that is representative of differences in composition of the two fluids passed thereto.

Sample valve 16 is employed to introduce predetermined volumes of samples selectively to the inlet of column 10. This is accomplished by means of a sample loop 32, which extends between ports 34 and 36. The volume of sample loop 32 is selected in accordance with the desired volume of sample to be introduced into the valve. When the valve is in the position illustrated, the ports are connected in the direction shown by the solid lines. Carrier fluid thus flows from conduit 12 to conduit 22. Sample material flows from conduit 18 through sample loop 32 and is vented through conduit 38, which communicates with port 40. When the sample valve is actuated, the ports are connected in the direction shown by the illustrated broken lines. At this time, carrier fluid displaces the volume of sample trapped in sample loop 32 and forces this sample into column 10. The incoming sample is passed to vent line 38 at this time. Sample valve 16 is pneumatically operated and receives operating pressure from a pilot valve 42. Power gas is introduced into valve 42 through an inlet line 44. Line 46 extends between the pilot valve 42 and sample valve 16. Line 48 extends from valve 16 to a vacuum pump 50 to facilitate operation of the sample valve under certain conditions. The operation of the sample valve can be controlled by a programmer 52, which actuates pilot valve 42 at predetermined intervals. Operation of the sample valve by pilot valve 42 is described in greater detail in U.S. Pat. No. 3,376,894.

Valve 16 is illustrated in greater detail in FIGS. 2-5. inclusive. Valve 16 includes a unitary housing body 54, a valve cap body 56, a manifold body 58 and the valve actuating components positioned within the housing 54. The unitary housing body 54 has a planar surface 60 at one end thereof and a cylindrical recess 62 formed in the opposite end thereof. Cylindrical recess 62 has a closed end 64 and an open end 66.

Valve cap body 56 has a planar face 68. The valve cap body, 56, has ports or passaeways 36, 24, 14, 34, 20 and 40 in the face 68 of valve cap body 56.

The unitary body housing 54 has a number of linear passageways 80, 82, 84, 86, 88 and 90 (FIG. 4), corresponding to the number of valved flow paths, e.g., 6 passageways, or with each linear passageway extending perpendicularly through body 54 from top surface 60. Passageways 80-90 are positioned to align with port holes in port cap body 56. Each passageways 80-90 is fitted with a plunger 92, 94, 96, 98, 100 and 102, respectively, which has a length greater than the length of the respective passageways 80-90 so as to extend into cylindrical recess 62. The plungers, 92-102, can be metal rods, as in Broerman, U.S. Pat. No. 3,387,496 or a series of spheres surmounted by a hemisphere having the flat surface thereof facing the valve cap body 56, as in Broerman, U.S. Pat. No. 3,376,894 or any other suitable plunger means. Also formed in the surface 60 of body 54 are 6 arcuate grooves 104, 106, 108, 110, 112 and 114, arranged between passageways 92, 94, 96, 98, 100 and 102, respectively.

A diaphragm 116 is positioned against planar face 68 of valve cap body 56 to encompass the portion of planar face 68 and the ports 36, 24, 14, 34, 20, and 40. Diaphragm 116 obviously also covers ports or passageways 80-90 and grooves 104-114 in face 60 of body 54. A pin 118 or a plurality of pins can be secured in openings in either the valve cap body 56 or the housing body 54 with the other body having corresponding openings to provide for the mating of the diaphragm 116, housing body 54 and valve cap body 56, only in a predetermined relationship. At least three cap screws, 120, 122 and 124 can be employed to releaseably secure the valve cap body 56 to housing body 54 with the planar surface 68 of valve cap body 56 facing the planar face 60 of the housing body 54 with the diaphragm 116 positioned therebetween. The use of cap screws 120, 122 and 124 to secure the cap body 56 to the housing body 54 permits the achievement of greater sealing force between the valve cap body 56 and the housing body 54 than could be achieved by the use of other securing means, such as split tension rings, etc.. The cap screws 120, 122 and 124 are readily removed without need of special tools. Thus, the use of cap screws 120, 122 and 124 permits the diaphragm to be cleaned or replaced without having to remove the valve from the chromotographic temperature-control zone. An O ring 126 can be positioned in an annular groove in the face 60 of housing body 54, coaxially with and spaced outwardly from the diaphragm 116 to thereby enhance the seal around the outer portions of the diaphragm 116. The utilization of at least 3 cap screws avoids dishing distortion problems which can be encountered with a single cap screw or even two cap screws. The diaphragm 116 has a diameter sufficiently large to completely cover ports, 36, 24, 14 34, 20 and 40, recesses 104-114 and ports 80-90, but it is desirable that the diameter of the diaphragm 116 not be any larger than necessary to provide a desired margin of safety, as the smaller the diameter the greater the sealing force per square inch betwen the diaphragm 116 and the valve cap body 56 and the valve housing body 54. The diaphragm 116 should be of any suitable flexible material, and can be a single layer of material or a plurality of layers of material. In one embodiment, diaphragm 116 has three layers of material, the inner layer being formed of nylon and the two outer layers being formed of polytetrafluoroethylene.

An annular piston 125, having an axial opening 127 therethrough, is positioned in cylindrical recess 62 for reciprocal movement along the axis of the cylindrical recess 62 and in sealing engagement with the wall of cylindrical recess 62. An O ring 129 can be positioned in an annular groove formed in the outer cylindrical wall of piston 125 to enhance the seal between the piston 125 and the housing body 54.

A second piston 126 is positioned in cylindrical recess 62 between annular piston 125 and the open end 66 of cylindrical recess 62 for reciprocal movement along the axis of cylindrical recess 62 and in sealing engagement with the cylindrical wall of cylindrical recess 62. Piston 126 has a central projection 128 which extends upwardly from the main portion of piston 126 through the opening 127 in annular piston 125. Piston 126 and the annular piston 125 are of such configuration that a chamber 130 is formed between annular piston 125 and second piston 126. The annular wall of housing body 54 and manifold body 58 have a fluid passageway 46 extending therethrough in communication with chamber 130. One or more O rings 132 can be employed to provide a seal between projection 128 and the inner cylindrical wall 127 of piston 125. Piston 126 can also be provided with an O ring 134, to provide a seal between the cylindrical wall of housing body 54 and piston 126.

A spring 136 is positioned between the closed end of cylindrical recess 62 and piston 125 to urge piston 125 away from the closed end of cylindrical recess 62.

To assure alignment of piston 125 and piston 126 in a particular rotational direction, as will be pointed out hereinafter, in cylindrical cavity 62 of body 54, a pin 138 is provided which passes into an appropriate opening in the top of housing body 54, into an appropriate opening in piston 126 and through an appropriate opening in piston 125.

Pistons 125 and 126 are biased upwardly by means of coil-type spring 140. Spring 140 is appropriately mounted in spring housing 142 which has an axially-disposed cylindrical opening 144 adapted to receive spring 140. Since coil-type springs have a tendency to cant slightly and to rotate slightly when compressed and released, centering means is provided to maintain spring 140 axially aligned with pistons 125 and 126 and to provide even axial pressure on piston 126 and thereby on piston 125. The centering means includes an upper end cap 146, adapted to fit on the top of spring 140, and lower cap 148, adapted to fit on the lower end of spring 140. Cap 146 has an axial projection which projects into the center of spring 140 and an extended annular flange which fits around the outside of spring 140. End cap 146 is mounted to slide in cylindrical cavity 144 of spring housing 142 as spring 140 is compressed and released. In order to provide even and axial pressure on piston 126 and compensate for any tendencies of spring 140 to cant or rotate, pivot ball 150 is mounted on an appropriate recess in the top of end cap 146. Pivot ball 150 provides rolling, essentially point contact with piston 126. End cap 148 has formed in its lower end, a cone-type depression 152. Mounted in cone-type depression 152 is a second pivot ball 154. Pivot ball 154 performs essentially the same function as pivot ball 150, i.e., it forms part of the centering means which maintains spring 140 axially aligned with pistons 125 and 126 and prevents any canting or rotation of spring 140 from being transmitted through pressure on the pistons 126 and 125. Pivot ball 154 is held in place by means of pivot ball support 156. Pivot ball support 156 is threadedly mounted through an opening in spring housing 142. By threadedly mounting support 156, the tension of spring 140 can be adjusted both initially and during use, as to compensate for loss of resiliency, etc. The upper end of pivot ball support 156 is contoured to essentially the same contour as cone-type depression 152 in end cap 148 but is spaced slightly from cone-type depression 152 to permit slight lateral movements, thereby also aiding in the centering function of pivot ball 154. An appropriately formed arcuate depression is formed on the axis of pivot ball support 156 to receive pivot ball 154. Thus pivot ball 154 provides rolling contact between end cap 148 and pivot ball support 156 to provide accurate alignment and to prevent transmission of any canting or rotation of spring 140 to the pistons 126 and 125. Since the valve assembly is designed to operate between two positions quite rapidly, it is desirable that any air trapped below piston 126 and in the cylindrical cavity 144, be released when spring 140 is compressed. For this purpose, vent openings 158 and 159 be provided in end cap 146 and housing 142.

. Manifold body 58 is held in position on housing body 54 by means of cap screws 162 and 164. Vacuum line 48 passes through manifold body 58 and the cylindrical wall of housing body 54 to permit the drawing of a vacuum in the space between piston 125 and the closed end of cylindrical opening 62 in housing body 54.

In order to alternately operate three of the six plungers 92 through 102, the upper surfaces of pistons 125 and 126, which are in contact with plungers 92 through 102, are appropriately provided with contoured depressions. The axial extension 128 of piston 126 is provided with three spaced depressions 166, 168 and 170. Likewise, the upper surface of piston 125 is provided with three depressions 172, 174 and 176. Three of the plungers 92-102 rest in the depression 166, 168 and 170 of piston 126, whereas the other three plungers rest in the depressions, 172, 174 and 176 of piston 125. Accordingly, when actuating fluid is introduced under pressure through line 46 to chamber 130 between pistons 125 and 126, piston 126 moves downwardly and piston 125 moves upwardly. Thus, the three plungers resting in depressions 166, 168 and 170 of piston 126 will move downwardly relieving their pressure on diaphragm 116, whereas, the plungers resting in depressions 172, 174 and 176 of piston 125 will move upwardly, thus causing these plungers to press against diaphragm 116.

The actual operation of the valve assembly is explained in detail in the previously mentioned U.S. Pat. Nos. 3,387,496; 3,376,894 and 4,112,766, which are incorporated herein by reference. However, such operation will be explained herein briefly. It is to be recalled that plungers 92-102 are spaced between holes 36, 24, 14, 34, 20 and 40 in the face of valve cap body 56. When one or more plungers 92-102 are moved upwardly, pressure is applied to diaphragm 116, thereby preventing flow between the adjacent holes 36, 24, 14, 34, 20 and 40 in valve cap housing 56. On the other hand, when one or more of plunger 92 through 102 moves downwardly away from diaphragm 116, pressurized fluid through a ports 36, 24, 14, 34, 20 or 40 forces the diaphragm 116 downwardly into the corresponding channels 104-114 formed in the face of housing body 54, thus permitting flow between adjacent holes 36, 24, 14, 34, 20 and 40 in cap 56 above the corresponding channels 104-114 formed in the face of housing body 54. Obviously, any number of plungers 92-102 can be provided in multiples of two and thereby alternately operate in the same manner. The number of plungers operating in any specific sequence of operation can be essentially programmed by properly contouring the depressions in the upper faces of pistons 125 and 126. In the position shown in the drawings, without pressurized fluid between pistons 120 and 126, which can be considered to be at rest position, the other three of the plungers 92-102 are pressed upwardly by means of spring 140 thereby closing the corresponding three spaces between holes 36, 24, 14, 34, 20 and 40 in the face of valve cap 56 and preventing the diaphragm 116 from being deformed into the corresponding channels 104-114 in the upper face of housing body 54 and flow of fluid between the particular adjoining holes in the face of valve cap 56.

While specific elements, stuctures, assemblies, materials and modes of operation have been referred to herein, it is to be understood that such specific references are by way of illustration only and to set forth the best mode of the present invention and, therefore, such specific recitals are not to be considered limiting.

That which is claimed:

1. In a piston means, having a generally flat biasing surface, the improved biasing means, comprising:
  (a) coil spring means mounted within an elongated chamber adjacent said flat surface of said piston and adapted to exert pressure against said flat surface of said piston to bias said piston in a preselected direction;
  (b) spring retaining means, adapted to retain said spring means within said elongated chamber, including first end cap means mounted, on the end of said spring adjacent said piston and freely mounted within said elongated chamber, to move longitudinally within said elongated chamber, and stationary support means adjacent the end of said spring opposite said piston; and (c) centering means, adapted to maintain said retaining means and said spring axially aligned with said piston, including first pivot ball means, freely resting within a cavity in the end of said first and cap adjacent said piston, to roll freely within said cavity and make rolling, point contact with said flat surface of said piston.

2. Biasing means in accordance with claim 1 wherein the stationary support is longitudinally adjustable to adjust the tension on the spring.

3. Biasing means in accordance with claim 2 wherein the end of the elongated chamber opposite the piston is closed and the stationary support is an adjustable plug mounted in said closed end of said elongated chamber.

4. Biasing means in accordance with claim 3 wherein the adjustable plug is threadedly mounted in the closed end of the elongated chamber and is adjusted by threading said plug inwardly or outwardly.

5. Biasing means in accordance with claim 1 wherein the first cap adjacent the piston has a cross-sectional dimension sufficient to make sliding contact with the walls of the elongated chamber and is adapted to slide longitudinally in said elongated chamber in response to the compression and release of the spring.

6. Biasing means in accordance with claim 5 wherein the first end cap adjacent the piston has formed, in the end thereof opposite the piston, an annular groove adapted to receive the end of the spring and limit lateral movement between said spring and said first end cap.

7. Biasing means in accordance with claim 1 wherein a second end cap means is mounted on the end of the spring opposite the piston and a second pivot ball means is mounted in said second end cap in rolling, point contact with the stationary support.

8. Biasing means in accordance with claim 7 wherein the second end cap has a conical cavity formed therein, adapted receive the second pivot ball in rolling contact therein.

9. Biasing means in accordance with claim 7 wherein the stationary support is longitudinally adjustable to adjust the tension on the spring.

10. Biasing means in accordance with claim 9 wherein the end of the elongated chamber opposite the piston is closed and the stationary support is an adjustable plug mounted in said closed end of said elongated chamber.

11. Biasing means in accordance with claim 10 wherein the adjustable plug is threadedly mounted in the closed end of the elongated chamber and is adjusted by threading said plug inwardly or outwardly.

12. Biasing means in accordance with claim 7 wherein the second end cap has a cross-sectional dimension smaller than that of the elongated chamber to permit limited lateral movement of said second end cap within said elongated chamber.

13. Biasing means in accordance with claim 8 wherein the stationary support has a concave cavity therein, having a curvature greater than that of the second pivot ball and adapted to receive said second pivot ball in rolling contact therein.

14. Biasing means in accordance with claim 13 wherein the stationary support is a protruding plug having the end thereof, surrounding the concave cavity, conical in shape and generally conforming to the conical cavity in the second end cap and the second pivot ball means is mounted to provide a small space between the surface of said conical cavity in said second end cap and said conical surface of said plug.

15. Biasing means in accordance with claim 14 wherein the end of the elongated chamber opposite the piston is closed and the plug is threadedly mounted in said closed end of said elongated chamber and is adjusted by threading said plug inwardly or outwardly.

16. Biasing means in accordance with claim 7 wherein the second end cap has a cylindrical extension, adapted to fit within the spring and limit lateral movement between said spring and said second end cap.

17. Biasing means in accordance with claims 1, 2, 3, 4, 5, 6, 7, 9, 10, 11, 12, 8, 13, 14, 15 or 16 which additional includes a piston chamber means, a first piston adjacent the piston biasing means, having an axial boss protruding therefrom on the side thereof opposite said biasing means, a second annular piston slideably mounted about said boss and spaced from the adjacent face of said first piston means to form a fluid chamber between said first piston and said second piston and fluid inlet means, adapted to introduce pressurized fluid into said fluid chamber, whereby said first piston is moved axially against the bias of said spring and said second piston is moved away from said first piston when pressurized fluid is introduced into said fluid chamber, thereby forming a piston assembly.

18. Biasing means in accordance with claim 17 wherein a second spring means is mounted between the second piston and the end of the piston chamber adjacent the second piston.

19. Biasing means in accordance with claim 1, 2, 3, 4, 5, 6, 7, 9, 10, 11, 12, 8, 13, 14 15 or 16 which additionally includes a valve means having at least one slideably mounted closure means, a piston chamber means, connected to said valve means, at least one piston, operatively contacting said closure means and adapted to move said closure means into and out of its closed mode, thereby forming a valve assembly.

20. Biasing means in accordance with claim 19 wherein the piston means includes a first piston adjacent the piston biasing means, having an axial boss protruding therefrom on the side thereof opposite said biasing means, a second annular piston slideably mounted about said boss and spaced from the adjacent face of said first piston to form a fluid chamber between said first piston and said second piston, a fluid inlet means, adapted to introduce pressurized fluid into said fluid chamber, whereby said first piston is moved axially against the bias of said spring and said second piston is moved away from said first piston when pressurized fluid is introduced into said fluid chamber.

21. Biasing means in accordance with claim 20 wherein a second spring means is mounted between second piston and the end of the piston chamber adjacent said second piston.

22. Biasing means in accordance with claim 19 wherein the closure means includes at least two closure means and at least one of said two closure means is operatively associated with the first piston and at least a second of said two closure means is operatively associated with the second piston.

* * * * *